(12) United States Patent
Morishita et al.

(10) Patent No.: US 8,200,396 B2
(45) Date of Patent: Jun. 12, 2012

(54) APPARATUS FOR CONTROLLING LIGHTING ANGLE OF HEADLIGHTS OF VEHICLE

(75) Inventors: Masahiko Morishita, Toyoake (JP); Toru Hagiwara, Sapporo (JP)

(73) Assignees: Denso Corporation, Kariya (JP); National University Corporation Hokkaido University, Hokkaido (JP)

( * ) Notice: Subject to any disclaimer, the term of this patent is extended or adjusted under 35 U.S.C. 154(b) by 1094 days.

(21) Appl. No.: 12/009,584

(22) Filed: Jan. 18, 2008

(65) Prior Publication Data

US 2008/0262681 A1 Oct. 23, 2008

(30) Foreign Application Priority Data

Jan. 19, 2007 (JP) ................................ 2007-010696

(51) Int. Cl.
*G06F 7/00* (2006.01)
(52) U.S. Cl. .......................... 701/49; 701/409
(58) Field of Classification Search .................. 701/49, 701/207, 208, 408, 409; 362/466
See application file for complete search history.

(56) References Cited

U.S. PATENT DOCUMENTS

| 2002/0039294 A1* | 4/2002 | Okuchi et al. ............... 362/464 |
| 2002/0039296 A1* | 4/2002 | Nishimura et al. ........... 362/465 |
| 2003/0055548 A1 | 3/2003 | Horii et al. |
| 2005/0027419 A1* | 2/2005 | Horii et al. ............................ 701/49 |
| 2005/0169000 A1* | 8/2005 | Hasegawa ...................... 362/466 |

FOREIGN PATENT DOCUMENTS

| JP | 06-072234 | 3/1994 |
| JP | 06-191344 | 7/1994 |
| JP | 07-132773 | 5/1995 |
| JP | 2001-001832 | 1/2001 |
| JP | 2001-294080 | 10/2001 |
| JP | 2002-052976 | 2/2002 |
| JP | 2003-72460 | 3/2003 |
| JP | 2003-260979 | 9/2003 |
| JP | 2005-313806 | 11/2005 |

* cited by examiner

*Primary Examiner* — Ruth Ilan
*Assistant Examiner* — Robert A Coker
(74) *Attorney, Agent, or Firm* — Harness, Dickey & Pierce, PLC

(57) ABSTRACT

An apparatus is provided to control a lighting angle of headlights installed in a vehicle. In the apparatus, a curve of the road is calculated and the radius of the curve is obtained, based on the current position and the road information. The curve is located ahead of the vehicle. A distance from the current position to a starting point of the curve is calculated based on the current position and the road information. Determination is made as to whether or not the curve is an S-shaped curve based on the road information, and line-shape information showing a line shape of the S-curve is set in response to the determination results of the curve. A lighting angle of the headlights is calculated based on the radius of the curve, the distance and the line-shape information, and the lighting angle of the headlights is controlled based on the calculated lighting angle.

39 Claims, 7 Drawing Sheets

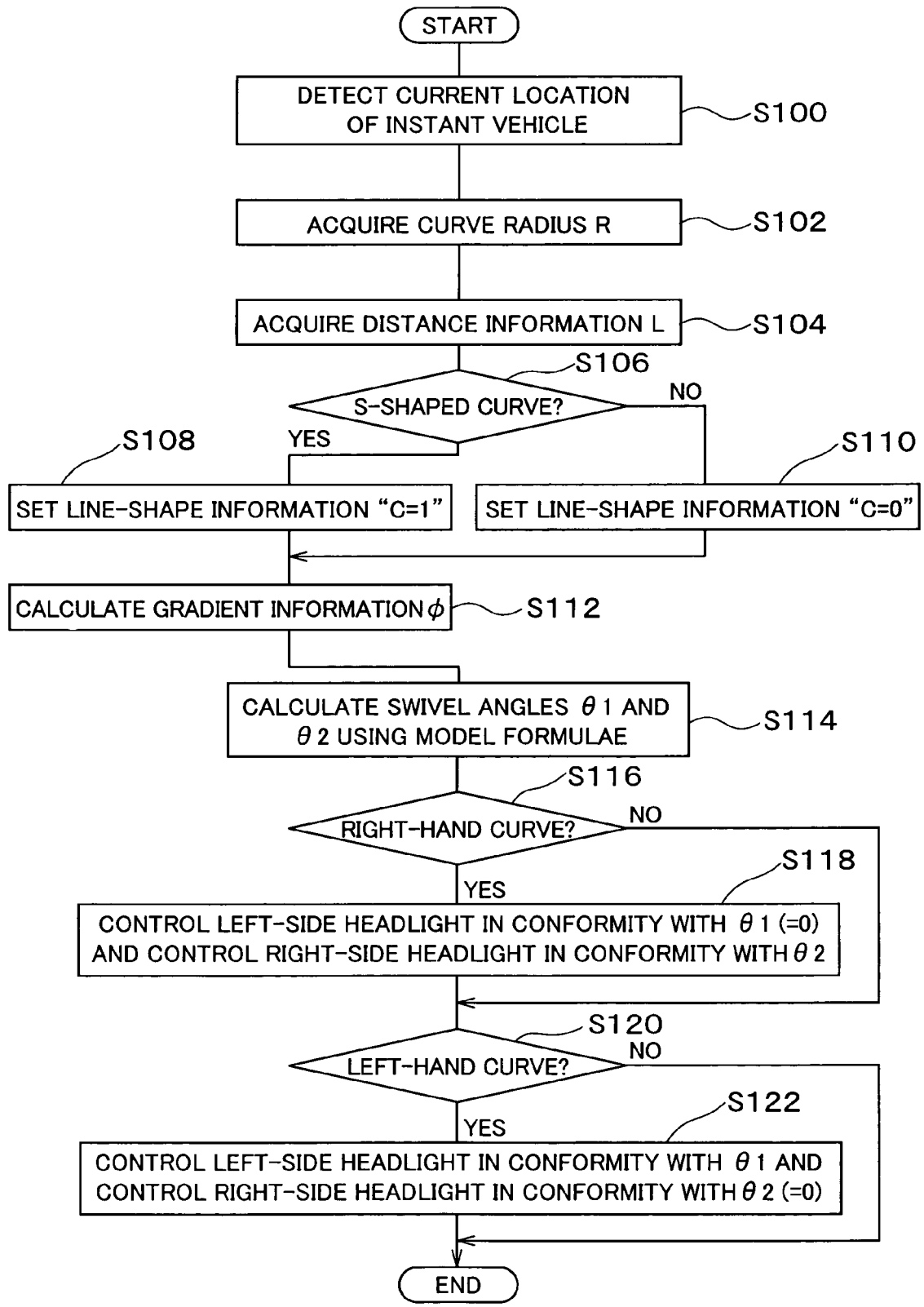

FIG.5A

| NO. | CURVE RADIUS R [m] | DISTANCE L [m] | LINE-SHAPE INFORMATION C | GRADIENT φ[%] | MEAN ANGLE [degree] |
|---|---|---|---|---|---|
| 1 | 75 | −27.8 | 1 | −10.0 | 10.5 |
| 2 | 75 | −13.9 | 1 | −10.0 | 7.5 |
| 3 | 75 | 0 | 0 | −10.0 | −3.0 |
| 4 | 150 | −27.8 | 0 | 7.5 | 0.0 |
| 5 | 150 | −13.9 | 0 | 7.5 | −0.5 |
| 6 | 150 | 0 | 0 | 7.5 | −3.0 |
| 7 | 100 | −27.8 | 0 | 0.0 | −1.0 |
| 8 | 100 | −13.9 | 0 | 0.0 | −3.0 |
| 9 | 100 | 0 | 0 | 0.0 | −4.0 |
| 10 | 100 | −27.8 | 0 | 10.0 | 0.0 |
| 11 | 100 | −13.9 | 0 | 10.0 | −2.0 |
| 12 | 100 | 0 | 0 | 10.0 | −3.5 |
| 13 | 50 | −27.8 | 0 | 2.5 | −2.0 |
| 14 | 50 | −13.9 | 0 | 2.5 | −3.0 |
| 15 | 50 | 0 | 0 | 2.5 | −5.0 |

FIG.5B

| NO. | CURVE RADIUS R [m] | DISTANCE L [m] | LINE-SHAPE INFORMATION C | GRADIENT φ [%] | MEAN ANGLE [degree] |
|---|---|---|---|---|---|
| 1 | 75 | −27.8 | 1 | −8.0 | −1.0 |
| 2 | 75 | −13.9 | 1 | −8.0 | 6.0 |
| 3 | 75 | 0 | 0 | −8.0 | 14.0 |
| 4 | 200 | −27.8 | 0 | 0.0 | 2.5 |
| 5 | 200 | −13.9 | 0 | −2.5 | 5.0 |
| 6 | 200 | 0 | 0 | −5.0 | 8.5 |
| 7 | 100 | −27.8 | 1 | 0.0 | 2.0 |
| 8 | 100 | −13.9 | 1 | 0.0 | 9.0 |
| 9 | 100 | 0 | 0 | 0.0 | 14.0 |
| 10 | 125 | −27.8 | 0 | 8.0 | 11.0 |
| 11 | 125 | −13.9 | 0 | 7.5 | 13.5 |
| 12 | 125 | 0 | 0 | 7.0 | 14.0 |
| 13 | 50 | −27.8 | 0 | 5.0 | 11.0 |
| 14 | 50 | −13.9 | 0 | 4.0 | 14.0 |
| 15 | 50 | 0 | 0 | 3.0 | 15.0 |

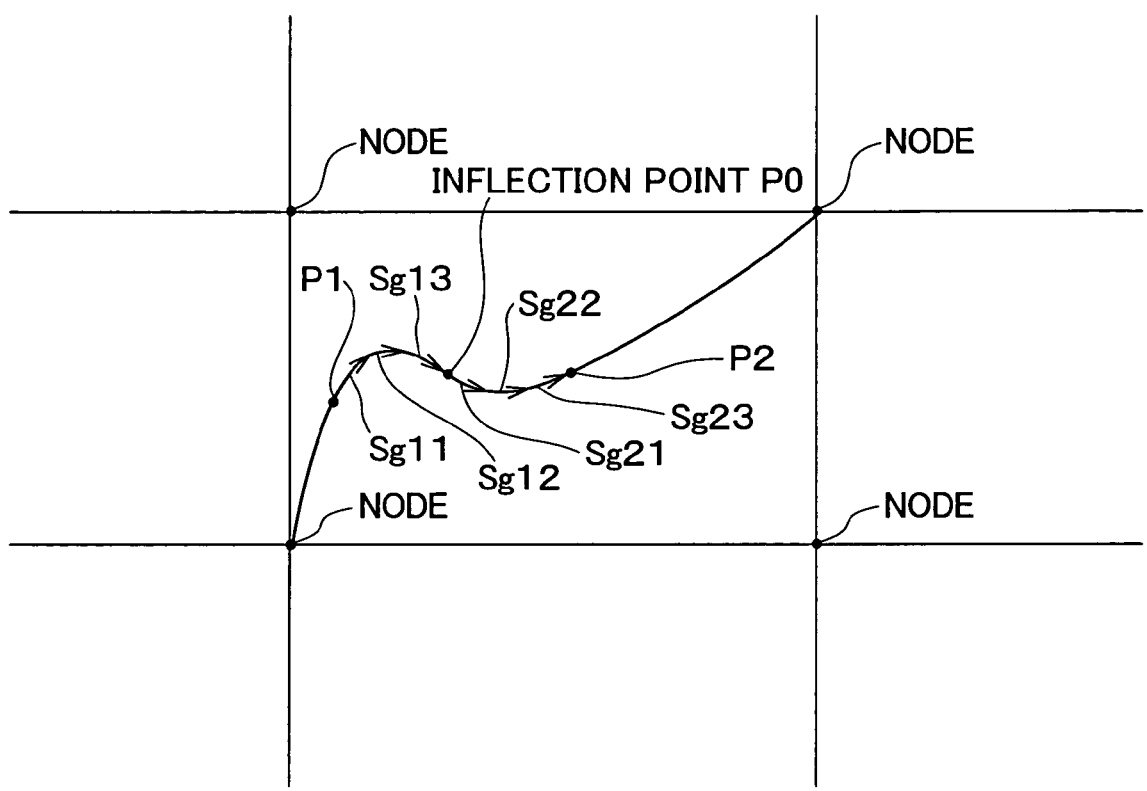

APPARATUS FOR CONTROLLING LIGHTING ANGLE OF HEADLIGHTS OF VEHICLE

CROSS-REFERENCE TO RELATED APPLICATION

This application is based on and claims the benefit of priority from earlier Japanese Patent Application No. 2007-010696 filed Jan. 19, 2007, the description of which is incorporated herein by reference.

BACKGROUND OF THE INVENTION

1. Technical Field of the Invention

The present invention relates to a headlight lighting angle control apparatus for controlling lighting angle of headlights installed in a vehicle.

2. Related Art

The technique of this art has been well known as disclosed, for example, in Japanese Patent Application Laid-Open Publication No. 2003-072460. The technique disclosed in this literature uses wheel speed which is detected by a wheel speed sensor for detecting wheel speed of the vehicle, and steering angle which is detected by a steering angle sensor for detecting steering angle of the steering wheel of the vehicle. Based on the wheel speed and the steering angle, the lighting angle of the headlights is controlled so that a point estimated to be reached by the vehicle after the expiration of a predetermined time interval, will fall within a range lit by the headlights of the vehicle.

It is true that, in the headlight lighting angle control apparatus mentioned above, the lighting angle of the headlights is controlled so that the point estimated to be reached by the vehicle after the expiration of a predetermined time interval, will fall within a range lit by the headlights of the vehicle. However, since the headlight lighting angle is determined based on the wheel speed and the steering angle, the timing for actually starting control of the headlight lighting angle falls immediately before the vehicle actually enters a curve, that is, falls after the vehicle has reached a point quite close to a starting point of the curve. Generally, a vehicle driver visually confirms in advance the depth, sharpness or the like of a curve before turning the steering wheel, or just before the vehicle actually goes around the curve. Accordingly, when taking a drive at night, an attempt to visually confirm the depth or sharpness of a curve just before the vehicle actually goes around the curve will ends up in vain because the curve is yet to be lit by the headlights. Thus, during nighttime driving, it is difficult for a vehicle driver to visually confirm in advance the line shape of a curve the vehicle is going to enter.

SUMMARY OF THE INVENTION

The present invention has been made in light of the circumstances described above, and has as its object to provide a headlight lighting angle control apparatus, which enables a driver of the vehicle to make a more accurate visual confirmation, in advance, of a line shape of a curve the vehicle is going to enter.

In order to achieve the object mentioned above, a mode of the present invention comprises an apparatus for controlling a lighting angle of headlights installed in a vehicle, comprising: position detecting means for a current location of the vehicle; storing means for storing road information showing a road on which the vehicle is running currently; curve obtaining means for obtaining, from the current position and the road information, a curve of the road which is located ahead of the vehicle and obtaining a radius of the curve; distance obtaining means for obtaining a distance from the current position to a starting point of the curve based on the current position and the road information; curve determining means for determining whether or not the curve is an S-shaped curve based on the road information; line-shape setting means for setting line-shape information showing a line shape of the S-curve, in response to determination results of the curve determining means; angle calculating means for calculating a lighting angle of the headlights based on the radius of the curve, the distance and the line-shape information; and controlling means for controlling the lighting angle of the headlights based on the calculated lighting angle.

In the configuration mentioned above, the lighting angle of the headlights is not calculated based on the actual wheel speed or steering angle as in the prior art mentioned above, but is calculated based on the information acquired in advance through the various means mentioned above. Thus, the lighting angle of the headlights can be controlled well in advance of the entry of the vehicle into a curve, coinciding with the timing for the vehicle driver to make a visual confirmation of the depth or sharpness of the curve, rather than being controlled immediately before the vehicle actually enters the curve.

In the case where, for example, the curve the vehicle is going to enter has a line shape successively turning in different directions as in an S-shaped curve, the lighting angle of the headlights is controlled in conformity with the line shape of the near side curve. Then, the lighting angle of the headlights is quickly controlled in conformity with the line shape of the following curve. In the conventional headlight lighting angle control apparatus mentioned above, the timing for actually starting control of the lighting angle of the headlights falls immediately before the actual entry of the instant vehicle into the curve. Accordingly, this may delay the timing for lighting the headlights for the driver to visually confirm the line shape of the near side curve, which may possibly disable the driver to make a visual confirmation of the line shape of the following curve. In this regard, the configuration mentioned above may enable calculation of the lighting angle of the headlights, watching over not only the line shape of the near side curve but also the line shape of the following curve, because the line-shape information acquired through the line-shape information acquiring means is the result of the determination on whether or not the curve is an S-shaped curve. Thus, the vehicle driver can make a more accurate visual confirmation of the line shape of the curve the vehicle is going to enter.

In order to achieve the above object, another mode of the present invention comprises an apparatus for controlling a lighting angle of headlights installed in a vehicle, comprising: position detecting means for a current location of the vehicle; storing means for storing road information showing a road on which the vehicle is running currently; curve obtaining means for obtaining, from the current position and the road information, a curve of the road which is located ahead of the vehicle and obtaining a radius of the curve; distance obtaining means for obtaining a distance from the current position to a starting point of the curve based on the current position and the road information; gradient obtaining means for obtaining gradient information showing a gradient of the vehicle in a direction along which the road continues; angle calculating means for calculating a lighting angle of the headlights based on the radius of the curve, the distance, and the gradient information; and controlling means for controlling the lighting angle of the headlights based on the calculated lighting angle.

In the configuration mentioned above, the lighting angle of the headlights is not calculated based on the actual wheel speed or steering angle as in the prior art mentioned above, but is calculated based on the information acquired in advance through the various means mentioned above. Thus, the lighting angle of the headlights can be controlled well in advance of the entry of the instant vehicle into a curve, coinciding with the timing for the vehicle driver to make a visual confirmation of the depth, sharpness or the like of the curve, rather than being controlled immediately before the vehicle actually enters the curve.

In the case where the curve the instant vehicle is going to enter is an ascending slope, for example, the distance lit by the headlights of the instant vehicle will be shorter than in the case of a flat road. In this regard, since the configuration mentioned above allows the lighting angle calculation unit to calculate the lighting angle of the headlights on the basis of the gradient information, the lighting angle control of the headlights can be performed taking into account of the gradient of the road. Thus, the vehicle driver can make a more accurate visual confirmation of the line shape of the curve the vehicle is going to enter.

Still another mode of the present invention comprises an apparatus for controlling a lighting angle of headlights installed in a vehicle, comprising: position detecting means for a current location of the vehicle; storing means for storing road information showing a road on which the vehicle is running currently; curve obtaining means for obtaining, from the current position and the road information, a curve of the road which is located ahead of the vehicle and obtaining a radius of the curve; distance obtaining means for obtaining a distance from the current position to a starting point of the curve based on the current position and the road information; curve determining means for determining whether or not the curve is an S-shaped curve based on the road information; line-shape setting means for setting line-shape information showing a line shape of the S-curve, in response to determination results of the curve determining means; gradient obtaining means for obtaining gradient information showing a gradient of the vehicle in a direction along which the road continues; angle calculating means for calculating a lighting angle of the headlights based on the radius of the curve, the distance, the line-shape information, and the gradient information; and controlling means for controlling the lighting angle of the headlights based on the calculated lighting angle.

In the configuration mentioned above, the lighting angle of the headlights is not calculated based on the actual wheel speed or steering angle as in the prior art mentioned above, but is calculated based on the information acquired in advance through the various means mentioned above. Thus, the lighting angle of the headlights can be controlled well in advance of the entry of the instant vehicle into a curve, coinciding with the timing for the vehicle driver to make a visual confirmation of the depth, sharpness or the like of the curve, rather than being controlled immediately before the vehicle actually enters the curve.

In the case where a curve the instant vehicle is going to enter has a line shape successively turning in different directions as in the case, for example, of an S-shaped curve, the lighting angle of the headlights are controlled in conformity with the line shape of the near side curve. Then, the lighting angle of the headlights is quickly controlled in conformity with the line shape of the following curve. In the conventional headlight lighting angle control apparatus mentioned above, the timing for actually starting control of the lighting angle of the headlights falls immediately before the actual entry of the instant vehicle into the curve. Therefore, this may delay the timing for lighting the headlights for the driver to visually confirm the line shape of the near side curve, which may possibly disable the driver to make a visual confirmation of the line shape of the following curve. Further, the inventors confirmed that, in the case where a curve the instant vehicle is going to enter is an ascending slope, for example, the distance ahead of the vehicle lit by the headlights is shorter than in the case of a flat road.

In this regard, the configuration mentioned above may enable calculation of the lighting angle of the headlights, watching over not only the line shape of the near side curve but also the line shape of the following curve, because the line-shape information acquired through the line-shape information acquiring means is the result of the determination on whether or not the curve is an S-shaped curve. The configuration mentioned above may also enable control of the lighting angle of the headlights in consideration of the gradient of the road, because the lighting angle calculation unit calculates the lighting angle of the headlights on the basis of the gradient information. Thus, the vehicle driver can make a more accurate visual confirmation of the line shape of the curve the vehicle is going to enter.

When the line shape of a curve has a shape of S, it has been desired by the vehicle driver that the lighting direction of the headlights is directed frontward of the vehicle even when the near side curve largely turns. In this regard, it is preferred that the constant and the coefficients are set to meet a condition that the swivel angle calculated when the curve is the S-shaped curve is smaller than the swivel angle calculated when the curve is not the S-shaped curve. Thus, it becomes possible to take a view of the line shape not only of the near side curve but also of the following curve.

It is preferred that the constant and the coefficients are set to make the swivel angle smaller as the curve radius becomes larger. A curve having a large radius means that the curve is gentle and that the road on which the instant vehicle travels is close to a straight road. Accordingly, it is desired that the lighting direction of the headlights is directed frontward of the vehicle.

It is preferred that the constant and the coefficients are set to make the swivel angle larger as the distance becomes smaller. Short distance means that the instant vehicle has come close to the starting point of the curve. Accordingly, it is desired that the lighting direction of the headlights is directed in the direction in which the vehicle takes a turn.

It is preferred that the constant and the coefficients are set through a test on a measurement comprising steps of i) a real vehicle is made to stop at each of a plurality of locations which provides predetermined distances from a starting point of a curve of a road to be tested, the plurality of locations including the starting point, ii) each of a plurality of test drivers sits on a driver's seat of the real vehicle, and iii) each test driver selects, in each test driver's visual sense, a swivel angle providing the highest visibility for the test driver as to a line shape of the curve, from a plurality of swivel angles prepared beforehand. Thus, a swivel angle desired by the test driver can be actually realized.

BRIEF DESCRIPTION OF THE DRAWINGS

In the accompanying drawings:

FIG. 3 is a flow diagram illustrating a procedure for controlling a headlight lighting angle, which is executed in the present embodiment;

FIG. 5A shows an example of the results of an experiment made for a left-hand curve;

FIG. 5B shows an example of the results of an experiment made for a right-hand curve;

FIG. 6 is an explanatory view illustrating processes for making a determination on whether or not a curve is an S-shaped curve.

DETAILED DESCRIPTION OF THE PREFERRED EMBODIMENTS

Figure 1A:
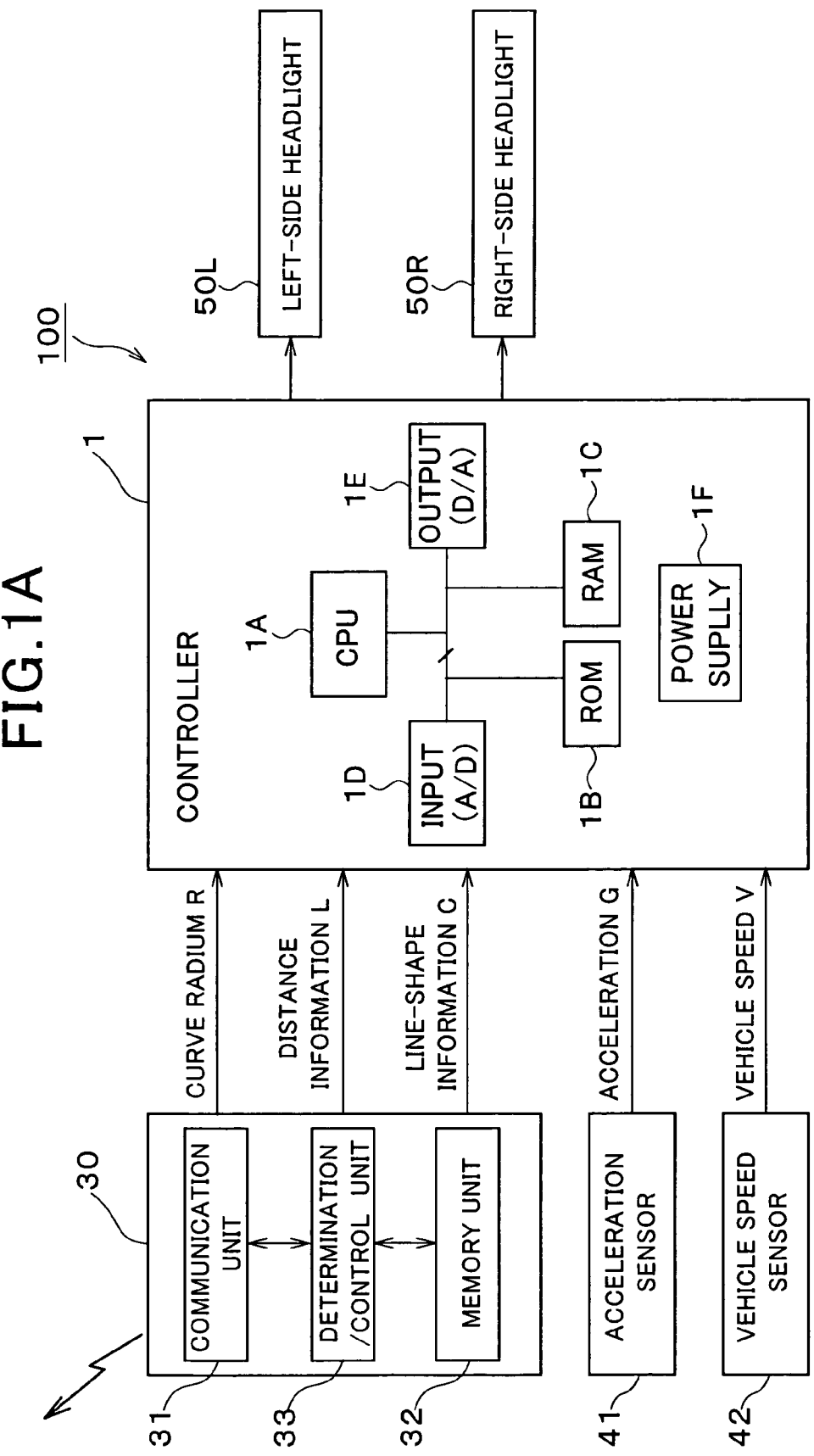
FIG. 1A is a block diagram illustrating a headlight lighting angle control apparatus according to an embodiment of the present invention.
Figure 2:
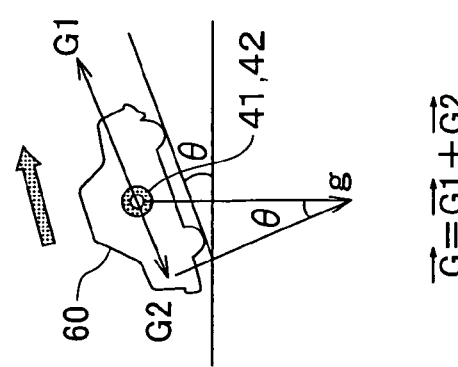
FIG. 2 is a pattern diagram illustrating a principle used in calculating gradient in a gradient calculation unit.
Figure 1B:
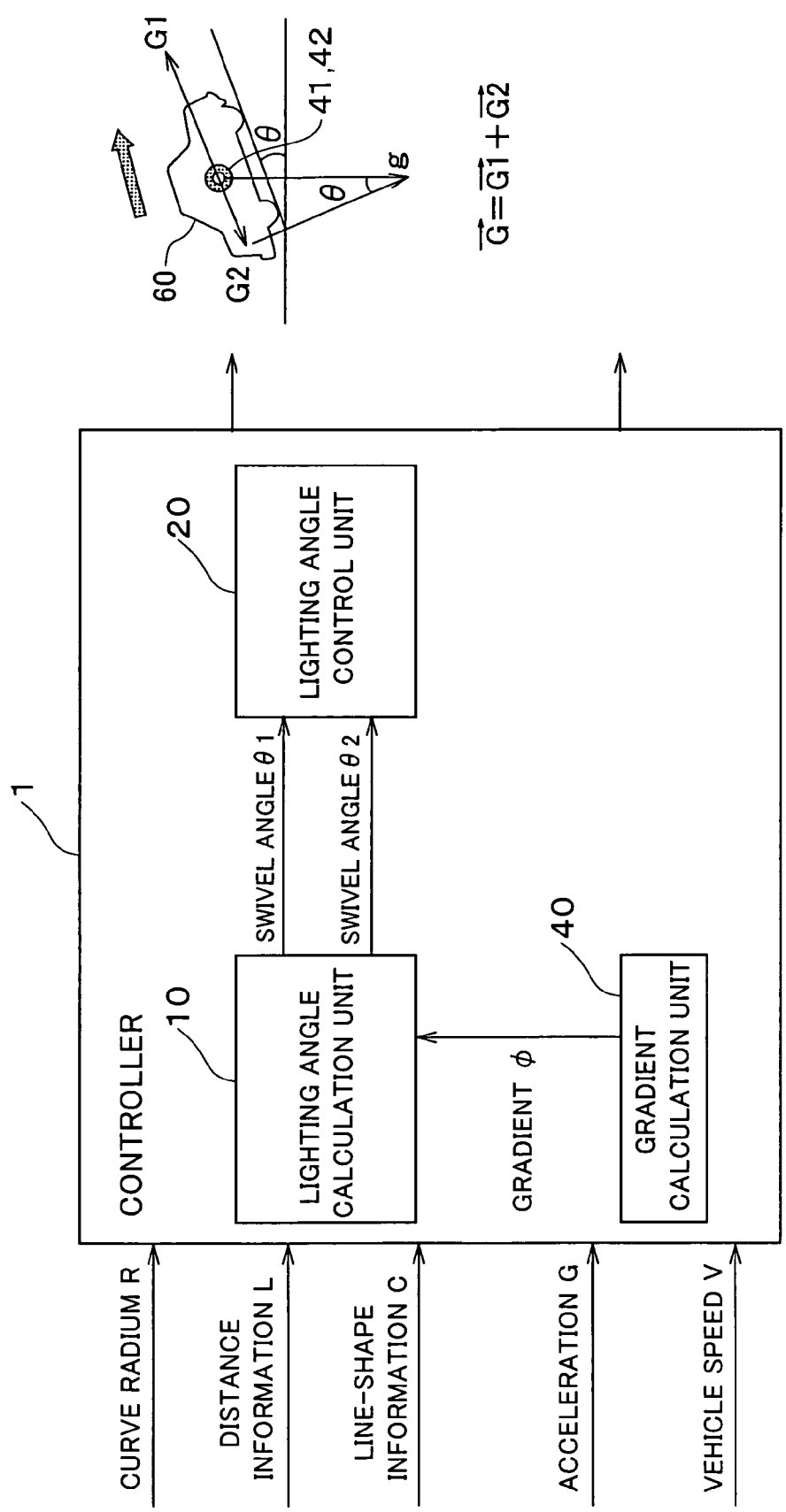
FIG. 1B is a block diagram illustrating a controller installed in the control apparatus.

Referring to FIGS. 1 to 3, hereinafter will be described a headlight lighting angle control apparatus according to an embodiment of the present invention. FIG. 1A is a block diagram generally illustrating a headlight lighting angle control apparatus 100 according to the present embodiment.

As shown in FIG. 1A, the headlight lighting angle control apparatus 100 basically includes a controller (or processor) 1 for executing various calculations, a car navigation apparatus 30 for acquiring various pieces of information on the road on which the vehicle equipped with the apparatus travels, an acceleration sensor 41 for detecting acceleration applied to the vehicle, a vehicle speed sensor 42 for detecting speed of the vehicle based on wheel speed, a light-side headlight 50L for lighting ahead of the vehicle on the left, and a right-side headlight 50R for lighting ahead of the vehicle on the right.

The car navigation apparatus 30 includes a communication unit 31 for making communication with a GPS (global positioning apparatus) satellite, a memory unit 32 (memory storing means) for storing information on a present location of the vehicle equipped with the car navigation apparatus 30, which is acquired through the communication unit 31, or information on the roads surrounding the vehicle, and a determination/control unit 33 for controlling the communication unit 31 and the memory unit 32. The memory unit 32 not only stores the road information acquired from the GPS satellite, but also additionally stores information newly acquired with the traveling of the vehicle and renews the currently stored road information. The determination/control unit 33 acquires information on a radius R [m] of a curve the vehicle is going to enter or information on a distance L [m] from the present location of the vehicle to a starting point of the curve, on the basis of the present location of the vehicle acquired from the communication unit 31 and the road information stored in the memory unit 32.

At the same time, the determination/control unite 33 makes a determination as to whether or not the curve is an S-shaped curve and acquires line-shape information C, which is the result of the determination. The line-shape information C provides information showing whether or not a curve is an S-shape curve having specified curve characteristic such as curvature.

Then, as shown in FIG. 1A, the car navigation apparatus 30 (determination/control unit 33) outputs the curve radius information R, the distance information L and the line-shape information C to the controller 1 loaded on the vehicle. The determination/control unit 33, if it determines the line shape of the curve as being an S-shape, outputs "1" as the line-shape information C. On the other hand, if the curve is determined as not being an S-shape, the determination/control unit 33 outputs "0" as the line-shape information C.

Details of the road information stored in the memory unit 32 will be described. The road information includes background data and road data. The background data serves as a background for a display unit, not shown, in displaying a road map, with a displayed region being divided into mesh, and each divided region called parcel (map section) mainly including natural terrain and railways. The road data is for displaying roads in line with the actual roads. The road data contained in one parcel consists of links between nodes which specify branching points, intersecting points and connecting points of all the roads included in the parcel. However, in the case where roads have forms other than a straight line, form complementary points are set between the nodes to simulate the actual forms of the associated road. In this case, lines connecting the nodes and the form complementary points as well as the lines connecting between the form complementary points are called segments. In this way, a link is made up of a plurality of segments.

Referring to FIG. 6, explained is a process of determining whether or not a curve is an S-shaped curve, which is executed by the determination/control unit 33. To begin with, an S-shaped curve is made up of two curves linked with each other and turning in different directions. The determination/control unit 33 acquires road information covering from the present location of the instant vehicle to a point located a predetermined distance forward. When the azimuth of the series of segments contained in the acquired road information turns from a state of changing in the same direction, through a state of changing in a direction different from the same direction, to a state of changing in a reversed direction, the determination/control unit 33 determines the curve as being an S-shaped curve.

For example, in the example shown in FIG. 6, when the vehicle is located at a position P1, the road extending forward therefrom curves rightward. Accordingly, the azimuth of segments Sg11, Sg12 and Sg13 corresponding to this part of the road changes clockwise in the same direction.

However, on reaching an inflection point P0, the right-hand curve of the road turns to a left-hand curve. Thus, the azimuth of segments Sg21, Sg22 and Sg23 from the inflection point P0 onward changes counterclockwise compared to the individual segments in the previous stage. In this way, when a road has an S-shape, the azimuth of the segments of the road first changes in a certain direction. Then, upon reaching an inflection point, the changing direction is reversed and the azimuth, from the point onward, changes in the opposite direction. Thus, a determination as to whether or not the road has an S-shape can be made based on the fact that the changing direction of the azimuth of the segments has been reversed.

Once the road on which the vehicle travels is determined as having an S-shape, it is desirable that the result of the determination is maintained until the vehicle reaches the inflection point, provided that the segments newly included in the predetermined distance as the vehicle travels, show an azimuth change in the reversed direction compared to the segments in the previous stage. It should be appreciated that the predetermined distance varies according to the traveling speed of the vehicle. Specifically, the predetermined distance is set so as to be larger as the vehicle speed becomes higher.

The left-side headlight 50L and the right-side headlight 50R basically employ a conventionally used technique. Both headlights 50L and 50R are provided with drivers (not shown), respectively, which respond to electrical control signals supplied from the controller 1 and drive their lighting angles in the horizontal and vertical directions defined in relation to the vehicle body. The lighting angle shows a direction along which light emitted from each headlight is transmitted straight with a spread thereof (refer to FIGS. 7A and 7B).

Specifically, in vehicles' left-hand-traffic countries like Japan, the left-side headlight 50L corresponds to the headlight installed on the side of the passenger's seat of the vehicle, and the right-side headlight 50R corresponds to the headlight installed on the side of the driver's seat of the vehicle. Since the acceleration sensor 41 and the vehicle speed sensor 42 utilize the conventionally used technique, detailed explanation herein is omitted.

The controller 1 practically includes, as shown in FIG. 1A, a central processing unit (CPU) 1A for performing various control processes and calculation processes based on a program described later; a memory unit including memories, such as a read only memory (ROM) 1B for storing various programs,(including part of a program shown in FIG. 3) and data and a writable random access memory (RAM) 1C; an input circuit 1D including an A/D converter; an output circuit 1E including a D/A converter; and a power supply 1F. That is, the controller 1 comprises a controller system. Depending of the functional performance performed by the CPU 1A, the controller functionally established components shown in FIG. 1B, in which there are provided a gradient calculation unit 40, a lighting angle calculation unit 10 and a lighting angle control unit 20. Hereinafter, these units will be used to explain the operations of the controller 1 according to need.

As shown in FIG. 1A, the controller 1 includes the gradient calculation unit 40. The gradient calculation unit 40 retrieves output values from the acceleration sensor 41 and the vehicle speed sensor 42, and at the same time calculates information on gradient (gradient ($\phi$)) along the length of the instant vehicle at the present location oh the road on which the vehicle travels. In particular, FIG. 2 shows an instant vehicle 60 climbing an ascending slope. As shown in FIG. 2, the vehicle 60 is influenced by acceleration G1 working in the traveling direction and gravitational acceleration g working in the vertical direction of the vehicle 60. The acceleration G1 can be calculated by differentiating a vehicle speed V that is an output value of the vehicle speed sensor 42, is with respect to time. A symbol G indicates acceleration in traveling direction components of the vehicle 60, which is detected by the acceleration sensor 41 and arranged with a traveling direction of the vehicle 60 as being a detection axis. A symbol G2 indicates a traveling direction component of the vehicle 60 whose gravitational acceleration is g. The individual components are in a relationship expressed by a vectorial sum of G=G1+G2. When $\phi$ indicates a gradient of the road based on the acceleration information which is acquired from both of the sensors, a relation G2=g×sin $\phi$ is established, which further establishes a relation expressed by the following Formula (1):

$$\phi = \sin^{-1}[(G-G1)/g] \quad (1)$$

The gradient calculation unit 40 periodically executes calculation of the gradient $\phi$ using the above Formula (1) and the calculated gradient $\phi$ is outputted to the lighting angle calculation unit 10 of the controller 1. Thus, gradient information acquiring means is made up of the gradient calculation unit 40, acceleration sensor 41 and vehicle speed sensor 42.

As shown in FIG. 1A, the lighting angle calculation unit 10 is provided in the controller 1. The lighting angle calculation unit 10 retrieves the curve radius R, the distance L and the line-shape information C from the car navigation apparatus 30 described above, while retrieving the gradient $\phi$ from the gradient calculation unit 40. On the basis of the retrieved various pieces of information, the lighting angle calculation unit 10 calculates swivel angles $\theta 1$ and $\theta 2$ of the left-side headlight 50L and the right-side headlight 50R, respectively. Model formulas used for the calculation of the swivel angles $\theta 1$ and $\theta 2$ will be described later. Then, the lighting angle calculation unit 10 outputs the calculated swivel angles $\theta 1$ and $\theta 2$ to the lighting angle control unit 20 in the controller 1.

Figure 7A:
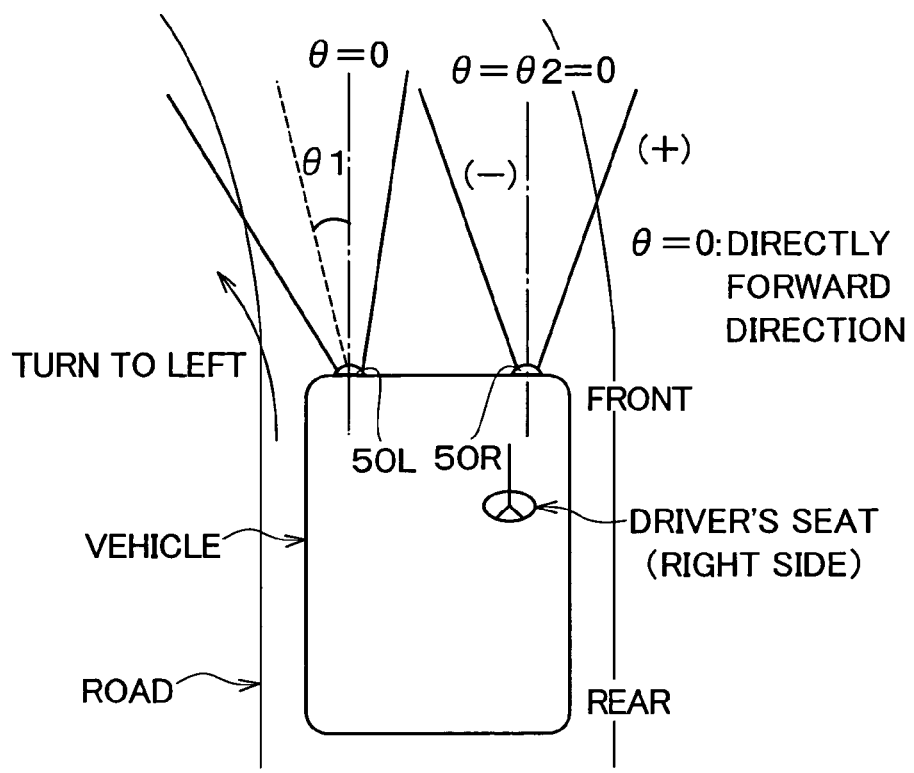
FIGS. 7A and 7B are illustrations showing the control of the lighting angle of the headlights.
Figure 7B:
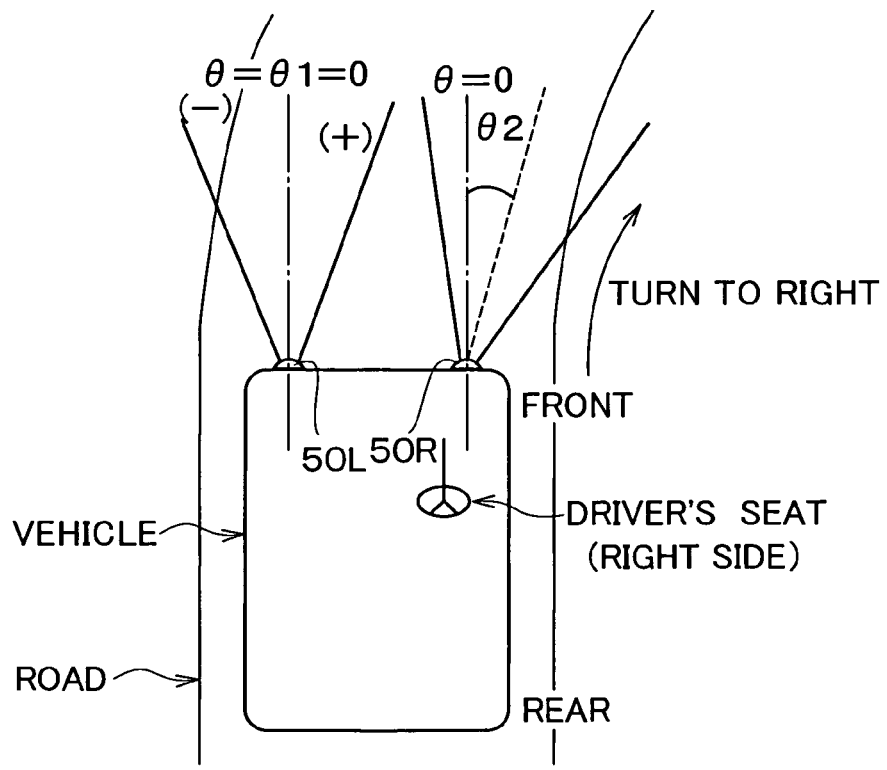

As shown in FIG. 1A, the lighting angle control unit 20 is provided in the controller 1 equipped in a vehicle. As mentioned above, the lighting angle control unit 20 retrieves the swivel angles $\theta 1$ and $\theta 2$ from the lighting angle calculation unit 10. As shown in FIG. 7A, when the vehicle turns to the left (to the side of the passenger's seat of a vehicle with a driver's steering on the right side), the lighting angle control unit 20 performs control so that the left-side headlight 50L will have the swivel angle $\theta 1$ which has been calculated based on the model formula. In this case, the lighting angle control unit 20 performs control so that the right-side headlight 50R will have a swivel angle expressed by $\theta 2=0$. In other words, the lighting angle control unit 20 performs control so that the right-side headlight 50R can put the light straight ahead of the vehicle. On the other hand, as shown in FIG. 7B, when the vehicle turns to the right (to the side of the driver's seat of a vehicle with a driver's steering on the right side), the lighting angle control unit 20 performs control so that the right-side headlight 50R will have the swivel angle $\theta 2$ which has been calculated based on the model formula. In this case, the lighting angle control unit 20 performs control so that the left-side headlight 50L will have a swivel angle expressed by $\theta 1=0$. In other words, the lighting angle control unit 20 performs control so that the left-side headlight 50L can put the light straight ahead of the vehicle.

Hereinafter will be described the model formulae used for calculating the swivel angles $\theta 1$ and $\theta 2$ in the lighting angle calculation unit 10.

Generally, a vehicle driver visually confirms in advance the depth, sharpness or the like of a curve before the driver turns the steering wheel of the vehicle, or before the vehicle actually enters the curve. However, during nighttime driving, for example, unless the lighting directions of the headlights are controlled, when entering a curve, in particular, in such a way that the point estimated to be reached by the vehicle 60 after the expiration of a predetermined time interval falls within the range lit by the headlights of the vehicle 60, the driver of the vehicle 60 cannot visually confirm the line shape of the curve. In the case where the curve is an S-shaped curve, i.e. has a line shape which successively turns in different directions, or when the curve is of an ascending slope, the driver is quite highly required to visually confirm the line shape of the curve.

Also, generally, for example, a driver's seat in left-hand-traffic countries is arranged on the right side of the vehicle compartment, and left-hand traffic is used. On the other hand, generally, in vehicles' right-hand-traffic countries, a driver's seat is arranged on the left side of the vehicle compartment, and right-hand traffic is used. Generally, in either of the cases, the driver's seat is rarely arranged at the center of the vehicle compartment. That is, the driver's seat is generally arranged on one side. Further, generally, for example, the left-side headlight of a vehicle in left-hand-traffic countries is installed being oriented more upward than the right-side headlight. Thus, the light is distributed so that the lighting distance ahead of the vehicle will be larger on the left side than on the right side. On the other hand, in right-hand-traffic countries, the right-side headlight of a vehicle is so installed being oriented more upward than the left-side headlight. Thus, the light is distributed so that the lighting distance ahead of the vehicle will be larger on the right side than on the left side. Because of the one-sided arrangement of the driver's seat and the different distribution of light, the lighting direction in which the vehicle driver can easily make a visual confirmation of the line shape of the curve, depends on whether the line shape is of a left-hand curve or of a right-hand curve.

The description hereinafter will be provided on the assumption that the driver's seat is arranged on the right side of the vehicle compartment and that the vehicle is driven under the circumstances of the left-hand traffic.

Specifically, when a line shape is of a right-hand curve with an increasing gradient, the lighting distance ahead of the vehicle associated with the right-side headlight 50R is smaller than in the case of traveling a flat road. In this case, the swivel angle $\theta 2$ is set so as to have a large value for possible increase of the lighting distance ahead of the vehicle associated with the right-side headlight 50R. Specifically, this will give the vehicle driver a better chance to visually confirm the line shape of the curve.

On the other hand, when a line shape is of a right-hand curve with a decreasing gradient, the right-side headlight 50R (as well as the left-side headlight 50L) originally puts the light in the horizontal direction. Accordingly, controlling or not controlling the right-side headlight 50R in conformity with the swivel angle $\theta 2$ gives no influence on the feasibility of the driver's visual confirmation of the line shape of the curve.

When a line shape is of a left-hand curve, a point where the driver of the instant vehicle pays the most attention is the curved line on the other side (forward side) of the road (the roadside of the opposite lane), rather than the curved line on this side of the road (the roadside of the lane on which the vehicle travels). As mentioned above, the left-side headlight 50L is installed being oriented more upward than the right-side headlight 50R, and thus the light is distributed so that the lighting distance ahead of the vehicle will be larger on the left side than on the right side. Accordingly, the point where the most attention is paid by the driver is sufficiently lit. In this way, in the case where the line shape of the curve turns toward the side of the passenger's seat, the need of the control for reducing the swivel angle $\theta 1$ is small. Controlling the swivel angle $\theta 1$ will not contribute to achieving the driver's much easier visual confirmation of the line shape of the curve.

Under the circumstances, the lighting angle calculation unit 10 according to the present embodiment carries out calculation of the swivel angle $\theta 1 (=\theta)$ of the left-side headlight 50L based on the following Formula (2), and calculation of the swivel angle $\theta 2 (=\theta)$ of the right-side headlight 50R, based on the following Formula (3).

$$\theta 1 = \alpha 1 + \beta 1 \times R + \gamma 1 \times L + \delta 1 \times C \qquad (2)$$

where $\theta 1$ is the swivel angle, $\alpha 1$ is a constant, $\beta 1$, $\gamma 1$ and $\delta 1$ are predetermined coefficients, R is the curve radius, L is the distance and C is the line-shape information.

$$\theta 2 = \alpha 2 + \beta 2 \times R + \gamma 2 \times L + \delta 2 \times C + \epsilon 2 \times \phi \qquad (3)$$

where $\theta 2$ is the swivel angle, $\alpha 2$ is a constant, $\beta 2$, $\gamma 2$, $\delta 2$ and $\epsilon 2$ are predetermined coefficients, R is the curve radius, L is the distance, C is the line-shape information and $\phi$ is the gradient information.

The swivel angles $\theta 1$ and $\theta 2$ use the forward direction as a reference, with the right side (the side of the driver's seat in left-hand-traffic countries) being positive, and the left side (the side of the passenger's seat in left-hand-traffic countries) being negative. The curve radius R [m], the distance L [m] and the line-shape information C in the above Formulas (2) and (3) are acquired at every predetermined period by the car navigation apparatus 30. Similarly, the gradient $\phi$ [%] is calculated at every predetermined period by the gradient calculation unit 40 on the basis of the above formula (1). In the gradient calculation unit 40, in conjunction with the calculation of the gradient $\phi$ [rad], the dimension is converted from [rad] to [%]. Values for the predetermined coefficients $\beta 1$ to $\delta 1$ and $\beta 2$ to $\epsilon 2$ as well as the constants $\alpha 1$ and $\alpha 2$ for weighting these independent variables, are determined by performing multiple regression analysis, for example, for the data obtained through experiments which will be described later.

Limiting values $\theta 1L$ and $\theta 2L$ are set for the swivel angles $\theta 1$ and $\theta 2$, respectively, calculated on the basis of the above Formulas (2) and (3). Specifically, when the swivel angle $\theta 1$ calculated on the basis of Formula (2) is smaller than the limiting value $\theta 1L$ as expressed by "$\theta 1 < \theta 1L (<0)$", the left-side headlight 50L is controlled in conformity with the limiting value $\theta 1L$ instead of the calculated swivel angle. Similarly, when the swivel angle $\theta 2$ calculated on the basis of Formula (3) is larger than the limiting value $\theta 2L$ as expressed by "$\theta 2 > \theta 2L (>0)$", the right-side headlight 50R is controlled in conformity with the limiting value $\theta 2L$ instead of the calculated swivel angle. The limiting values $\theta 1L$ and $\theta 2L$ are set in consideration of the glare felt by the drivers of oncoming vehicles, which glare is ascribed to the swiveling of the headlights of the instant vehicle. In the present embodiment, the limiting values $\theta 1L$ and $\theta 2L$ are set, for example, at "−5 degrees" and "15 degrees", respectively.

When a curve the instant vehicle is going to enter is an S-shaped curve, the lighting direction of each of the left- and right-side headlights 50L and 50R is preferably controlled so as to be closer to the frontward direction (directly forward direction: $\theta = 0$) of the vehicle, compared to the case where the curve is determined as not being an S-shaped curve (i.e. a single curve). In other words, it is preferred that each of the absolute values of the swivel angles $\theta 1$ and $\theta 2$ is closer to zero. The reasons for this are provided below. Specifically, in the case of traveling an S-shaped curve, soon after finishing traveling the near side curve, the vehicle reaches a starting point of the following curve. Accordingly, the driver is required to visually confirm the line shape of the following curve in a very short time interval soon after finishing traveling the near side so curve and before reaching the starting point of the following curve. In this case, if the swivel angle of the headlights is controlled so as to readily enable visual confirmation of only the line shape of the near side curve, the driver may have a difficulty in visually confirming the line shape of the following curve. Therefore, although the driver may have a little difficulty in visually confirming the near side curve, the headlights are preferably controlled so that the line shape of the following curve can also be visually confirmed by the driver, or so that the entire S-shaped curve can be overlooked. Such swivel angles correspond to ones that can light the frontward direction of the vehicle, that is, in the case of the present embodiment, correspond to setting each of the swivel angles $\theta 1$ and $\theta 2$ at values closer to zero.

As the radius of the curve the vehicle is going to enter becomes larger, it is preferred that the lighting directions of the left- and right-side headlights 50L and 50R are controlled so as to be closer to the frontward direction ($\theta = 0$) of the instant vehicle. In other words, it is preferred that the absolute value of each of the swivel angles $\theta 1$ and $\theta 2$ is closer to zero. The reasons for this are as follows. Specifically, a larger radius of a curve makes the curve more gentle, allowing the curve, on which the instant vehicle travels, to be closer to a straight road. This means that the angle for allowing the driver to readily make a visual confirmation of the line shape of the curve corresponds to an angle which will allow the forward direction of the vehicle to be lit. In the present embodiment, this corresponds to setting each of the swivel angles θ1 and θ2 at a value closer to zero.

Further, as the instant vehicle comes closer to a starting point of a curve, it is preferred that the lighting direction of each of the left- and right-side headlights 50L and 50R is turned to the direction in which the vehicle will take a turn. In other words, it is preferred that, in the case of a left-hand curve, the swivel angle θ1 (>0) is made larger, and that, in the case of a right-hand curve, the swivel angle θ2 (<0) is made smaller.

The present embodiment employs those values determined by the multiple regression analysis, for example, which is based on the data obtained through experiments described later. Accordingly, the predetermined coefficients β1 to δ1 and β2 to ϵ2 as well as the constants α1 and α2 can realize the desirable swivel angles θ1 and θ2.

FIG. 3 is a flow diagram illustrating a procedure of the headlight lighting angle control according to the present embodiment, which is performed in a cooperative manner by the car navigation apparatus 30 and the controller 1 in the headlight lighting angle control apparatus 100. Referring to FIG. 3, hereinafter will be described the operation of the present embodiment.

To begin with, the start of the automatic control of the headlight lighting angle is confirmed through an appropriate switch or the like, not shown. Then, at step S100, the car navigation apparatus 30 detects the present location of the instant vehicle through the communication with a GPS satellite, for example. At the subsequent step S102, the car navigation apparatus 30 acquires a starting point of the curve as well as a radius of a curve (curve radius R) the vehicle is going to enter. Then, at step S104, the car navigation apparatus 30 acquires the distance information L that is a distance from the present location of the vehicle to the starting point of the curve.

Upon acquirement of the various pieces of information, the car navigation apparatus 30 determines, at the subsequent step S106, whether or not the curve the vehicle is going to enter is an S-shaped curve. If it is determined that the curve is an S-shaped curve ("YES" at step S160), the car navigation apparatus 30 sets, at step S108, the line-shape information as being "C=1". On the other hand, if it is determined at step S106 that the curve is not an S-shaped curve ("NO" at step S106), the car navigation apparatus 30 sets, at step S110, the line-shape information as being "C=0".

When the line-shape information C has been set, the controller 1 (i.e., the gradient calculation unit 40) calculates, at step S112, the gradient information ϕ, as described above, on the basis of the acceleration information G outputted from the acceleration sensor 41 so and the vehicle speed V outputted from the vehicle speed sensor 42, using the above Formula (1).

At step S114, the controller 1 (i.e., the lighting angle calculation unit 10) calculates the swivel angle θ1 for the left-side headlight 50L and the swivel angle θ2 for the right-side headlight 50R on the basis of the acquired curve radius R, distance information L, line-shape information C and gradient information ϕ, using Formulas (2) and (3). In conjunction with the calculation of the swivel angles θ1 and θ2, the results of the calculation are outputted to the lighting angle control unit 20.

Then, the controller 1 (to be exact, the lighting angle control unit) determines, at step S116, whether or not the curve the vehicle is going to enter is a right-hand curve. If it is determined that the curve is a right-hand curve, ("YES" at step S116), the lighting angle control unit 20 controls, at step S118, the left-side headlight 50L in conformity with the swivel angle θ1 (=0) and the right-side headlight 50R in conformity with the swivel angle θ2 that has been calculated using Formula (3). On the other hand, if it is determined, at step S116, that the curve is not a right-hand curve ("NO" at step S116), the lighting angle control unit 20 allows the control to proceed to the subsequent step S120.

At step S120, the lighting angle control unit 20 determines whether or not the curve the vehicle is going to enter is a left-hand curve. If it is determined that the curve is a left-hand curve ("YES" at step S120), the lighting angle control unit 20 controls, at step S122, the left-side headlight 50L in conformity with the swivel angle θ1 that has been calculated using Formula (2) and the right-side headlight 50R in conformity with the swivel angle θ2 (=0).

As described above, the headlight lighting angle control apparatus 100 according to the present embodiment calculates the swivel angle θ1 when the instant vehicle 60 enters a left-hand curve, taking into account of the curve radius R, distance L and line-shape information C through a simple operation. As a result, the left-side headlight 50L is controlled to bring its lighting direction in conformity with the swivel angle θ1. When the vehicle 60 enters a right-hand curve, the swivel angle θ2 is calculated, taking into account of the gradient information ϕ in addition to the curve radius R, distance L and line-shape information C. As a result, the right-side headlight 50R is controlled to bring its lighting direction inconformity with the swivel angle θ2. In this way, lighting angle control of the headlights 50L and 50R can be realized according to the arrangement position of the driver's seat in the vehicle compartment.

Further, in the headlight lighting angle control apparatus 100 according to the present embodiment, the distance L is employed as an independent variable as indicated in Formulas (2) and (3). Thus, the headlight lighting angle control can be executed well in advance of the actual entry of the vehicle 60 into a curve, not immediately before the vehicle 60 actually enters the curve. Also, in the headlight lighting angle control apparatus 100 according to the present embodiment, the line-shape information C is employed as an independent variable as indicated in Formulas (2) and (3). Thus, the headlight lighting angle control can be executed according to the line shape of the curve the vehicle 60 is going to enter. Furthermore, in the headlight lighting angle control apparatus 100 according to the present embodiment, the gradient information ϕ is employed as an independent variable as indicated in Formula (3). Thus, the headlight lighting angle control can be executed according to the gradient of the curve the vehicle 60 is going to enter. In this way, the driver of the vehicle 60 can make a more accurate visual confirmation of the line shape of the curve the instant vehicle 60 is going to enter.

Figure 4:
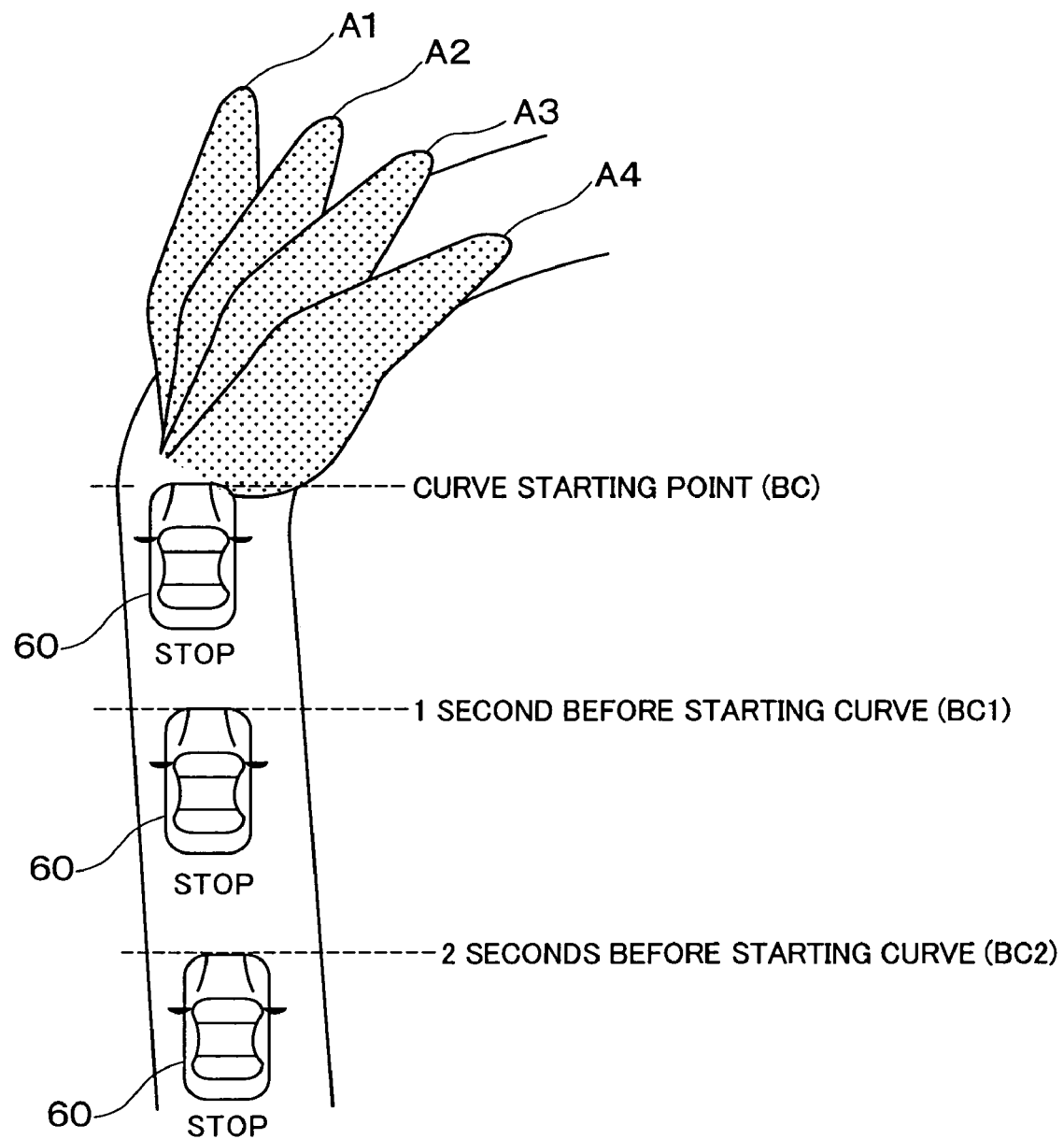
FIG. 4 is a pattern diagram illustrating an example of an experiment mode.

Referring now to FIGS. 4 and 5, hereinafter will be explained the experiment for acquiring the data required for determining the predetermined coefficients β1 to δ1 and β2 to ϵ2 as well as the constants α1 and α2 in the above Formulas (2) and (3). FIG. 4 is a pattern diagram illustrating an example of such an experiment mode. The figure includes an illustration of a road and a vehicle as viewed from the top.

As shown in FIG. 4, each of test drivers (persons who perform tests) sitting on the driver's seat of the vehicle 60 stops the vehicle 60 at a curve starting point BC, as well as points. BC1 and BC2 which are located respective predetermined distances back from the curve starting point BC of the curve. At the same time, at each of these stop points, the test driver selects a swivel angle from a plurality of predetermined swivel angles so that the selected swivel angle can make the driver feel the easiest to make a visual confirmation of a line shape of the curve.

Specifically, as shown in FIG. 4, the test driver first stops the vehicle 60 at the point BC2 which is located a second predetermined distance (e.g., "27.8 m") back from the curve starting point BC. The second predetermined distance corresponds to "two seconds" that will be taken for the vehicle 60 to reach the curve starting point BC at a speed, for example, of "50 km/hr."

When the vehicle 60 is stopped at the point BC2, the driver selects a swivel angle which makes the driver feel the easiest to visually confirm a line shape of the curve, from among the plurality of predetermined swivel angles. Particularly, in the case where the curve the vehicle 60 is going to enter is a right-hand curve, the driver selects a swivel angle from among four angles of "0, 5, 10 and 15 degrees" by actually swiveling the headlights, so that the selected angle can make the driver feel the easiest to visually confirm a line shape of the curve. In the case where the curve the vehicle 60 is going to enter is a left-hand curve, the driver selects a swivel angle from among two angles of "0 and −5 degrees" by actually swiveling the headlights, so that the selected angle can make the driver feel the easiest to visually confirm a line shape of the curve. Further, in the case where the curve the vehicle 60 is going to enter is an S-shaped curve, the driver selects a swivel angle from among five angles of "−5, 0, 5, 10 and 15 degrees" by actually swiveling the headlights, so that the selected angle can make the driver feel the easiest to visually confirm a line shape of the curve. Due to the one-sided arrangement of the driver's seat in the vehicle compartment, the choices of the swivel angles are different depending on the type of the curve.

Upon selecting a swivel angle at the point BC2, the driver moves the instant vehicle 60 up to the point BC1 which is located a first predetermined distance (e.g., "13.9 m") back from the curve starting point BC. The first predetermined distance corresponds to "one second" that will be taken for the vehicle 60 to reach the curve starting point BC at a speed, for example, of "50 km/hr." Then, selection of a swivel angle is also carried out at this point BC1 in the manner similar to the one carried out at the previous point BC2. Selection of a swivel angle is also carried out similarly at the curve starting point BC. If a swivel angle "0 degree" is selected, a region indicated as a lighting range "A1". in FIG. 4 is lit by the headlights 50L and 50R. Similarly, if each of swivel angles "5 degrees" to "15 degrees" is selected, each of regions indicated as lighting ranges "A2" to "A4" is lit, respectively, by the headlights 50L and 50R.

When finishing selecting swivel angles for a right-hand curve as described above, the series of swivel-angle selection is also carried out for a left-hand curve and an S-shaped curve. As a matter of course, the curve radius R and the gradient $\phi$ are both different between the left-hand curve, S-shaped curve and right-hand curve.

FIG. 5A shows a part of the results of the experiment for left-hand curve. FIG. 5B shows a part of the results of the experiment for right-hand curve. It should be appreciated that each of values indicated in the column of "mean angle" in each of FIGS. 5A and 5B is a mean value calculated for all the test drivers.

As shown in FIG. 5A, when the curve radius R increases, or when the curve becomes gentle, in left-hand curve, the line shape of the curve can be visually confirmed without the necessity of swiveling the headlights. Accordingly, the absolute value of the swivel angle el becomes small (which means that the frontward direction of the vehicle 60 is lit). Also, in left-hand curve, as the vehicle 60 comes close to the starting point BC as "point BC2→point BC1→starting point BC", the headlights are required to be largely swiveled. Accordingly, the swivel angle $\theta 1$ becomes small (the absolute value of the swivel angle $\theta 1$ becomes large). According to the multiple regression analysis carried out for the results of the experiment mentioned above including the results of the experiment indicated in FIG. 5A, the gradient $\phi$ barely influences the swivel angle $\theta 1$. The inventors thus confirmed that, in determining the swivel angle $\theta 1$, the gradient $\phi$ is not required to be considered. Meanwhile, the inventors also confirmed that other independent variables give influences on the swivel angle $\theta 1$ in the order of "line-shape information C→distance L→curve radius R".

As shown in FIG. 5B, in a right-hand curve, similar to the case of the left-hand curve, when the curve radius R increases, or when the curve becomes gentle, the line shape of the curve can be visually confirmed without the necessity of swiveling the headlights. Accordingly, the absolute value of the swivel angle $\theta 2$ becomes small (which means that the frontward direction of the vehicle 60 is lit). Also similar to the case of the left-hand curve, as the vehicle 60 comes close to the starting point BC as "point BC2→point BC1→starting point BC", the swivel angle $\theta 2$ becomes large because of the necessity of largely swiveling the headlight. According to the multiple regression analysis carried out for the results of the experiment mentioned above including the results of the experiment indicated in FIG. 5B, the inventors confirmed that the swivel angle $\theta 2$ is influenced by the "line-shape information C→gradient $\phi$→distance L→curve radius R" in this order.

The coefficients in Formulas (2) and (3) are in relationships expressed by "absolute value of $\delta 1$>>absolute value of $\gamma 1$>absolute value of $\beta 1$" and "absolute value of $\delta 2$>> absolute value of $\epsilon 2$>absolute value of $\gamma 2$>absolute value of $\beta 2$".

It should be appreciated that the headlight lighting angle control apparatus of the present invention is not limited to the configuration exemplified in the above embodiment, but may be implemented in the following embodiment, for example, which is an appropriate modification of the present embodiment.

In the embodiment described above, the gradient information acquiring means has been made up of the gradient calculation unit 40, the acceleration sensor 41 and the vehicle speed sensor 42. Also, in the above embodiment, the gradient of the road in the forward direction of the instant vehicle has been estimated based on the gradient information of the vehicle at the present location, because the gradient of the road almost always gradually changes. A specific configuration of the gradient information acquiring means however is not limited to such a configuration.

For example, the road information stored in the memory unit 32 of the car navigation apparatus 30, may be configured to include the gradient information of each portion of the road indicated by the links and segments, so that the gradient of the road in the forward direction of the instant vehicle can be calculated based on the gradient information. Alternatively, the altitude information at every point of each road obtained from a GPS when the vehicle travels on the road may be stored, so that the gradient of the road in the forward direction of the vehicle can be calculated based on the altitude information the next time the vehicle travels on the same road. In this way, the gradient of the road in the forward direction of the vehicle can be calculated in a more accurate manner.

As has been indicated in FIG. 6, a line shape of a curve has been determined as having a shape of S based on the fact that the azimuth of the segments consisting fine divisions of the road and has been changed in a certain direction, has been reversely directed upon reaching an inflection point. The method of making a determination however is not limited to this. What matters is to determine whether or not a line shape of a curve has an S-shape, or to acquire information whether or not the curve has an S-shape. If only such a determination or acquirement is achieved, selection can be optionally made as to the method and means for making a determination on the line shape, as well as the method and means for acquiring the information. An S-shaped curve has been referred to as a curve consisting of two linked curves turning in different directions, but an S-shaped curve may also be referred to as a curve having a very short straight road portion between the two curves.

As has been described referring to FIG. 4, in the experiment mode carried out in the above embodiment and modifications, the test driver seated on the driver's seat of the vehicle 60 has stopped the vehicle 60 at the plurality of points BC1 and BC2 located predetermined respective distances back from the curve starting point BC and at the curve starting point BC. At the same time, the test driver has selected a swivel angle from among a plurality of predetermined swivel angles, so that the selected swivel angle can make the driver feel the easiest to visually confirm the line shape of the curve. Mode of experiment however is not limited to this mode. For example, the number of points may be increased, where the test driver selects a swivel angle which will make the driver feel the easiest to visually confirm the line shape of the curve, or the speed of the instant vehicle, based on which the predetermined distances have been set, may be changed. Alternatively, the number of selections of the swivel angle may be increased, or the test driver may voluntarily set a swivel angle and measure the swivel angle. Thus, an experiment mode can be optionally selected if only a swivel angle can be quantified using the curve radius R, distance L, line-shape information C and gradient φ as independent variables, so that the quantified swivel angle can make the driver feel the easiest to visually confirm the line shape of the curve.

In the experiment mode carried out in the embodiment and modifications described above, a swivel angle has been quantified using the curve radius R, distance L, line-shape information C and gradient p as independent variables, so that the quantified swivel angle can make the driver feel the easiest to visually confirm the line shape of a curve. The above embodiment has then employed the multiple, regression analysis for the results of the experiment to determine the predetermined coefficients $\beta 1$ to $\delta 1$ and $\beta 2$ to $\epsilon 2$ as well as the constants $\alpha 1$ and $\alpha 2$ in Formulas (2) and (3). However, the method for determining the coefficients and constants is not limited to this. Alternatively, for example, these coefficients and constants may be determined through simulation according to the tendency of the coefficients described above.

In the embodiment and modifications described above, the lighting angle calculation unit 10 has calculated a swivel angle based on Formulas (2) and (3), irrespective of whether the curve the instant vehicle is going to enter is a right-hand curve or a left-hand curve, as indicated at the process of step S114. Alternatively, when the curve the instant vehicle is going to enter is a right-hand curve, the result of the calculation for the swivel angle $\theta 1$ of the left-side headlight 50L may be forcedly zeroed, while the swivel angle $\theta 2$ of the right-side headlight 50R may only be calculated based on Formula (3). Similarly, when the curve the vehicle is going to enter is a left-hand curve, the result of the calculation for the swivel angle $\theta 2$ of the right-side headlight 50R may be forcedly zeroed, while the swivel angle $\theta 1$ of the left-side headlight 50L may only be calculated based on Formula (2). In this case, the lighting angle control unit 20 may only control the left- and right-side headlights 50L and 50R in conformity with the calculated swivel angles $\theta 1$ and $\theta 2$, respectively, without carrying out a determination on the curve the vehicle is going to enter.

In the embodiment and modifications described above, when the curve the instant vehicle is going to enter is a right-hand curve, the lighting angle control unit 20 has controlled the left-side headlight 50L in conformity with the swivel angle $\theta 1$ (=0), while controlling the right-side headlight 50R in conformity with the swivel angle $\theta 2$ calculated using Formula (3), as indicated at the process of step S118. Similarly, when the curve the vehicle is going to enter is a left-hand curve, the lighting angle control unit 20 has controlled the left-side headlight 50L in conformity with the swivel angle $\theta 1$ calculated using Formula (2), while controlling the right-side headlight 50R in conformity with the swivel angle $\theta 2$ (=0), as indicated at the process of step S122. Briefly, either one of the left- and right-side headlights 50L and 50R has been swiveled. Alternatively, when the curve the vehicle is going to enter is a left-side curve, both the left- and right-side headlights 50L and 50R may be controlled in conformity with the swivel angles based on Formula (2). Also, when the curve the vehicle is going to enter is a right-side curve, both the left- and right-side headlights 50L and 50R may be controlled in conformity with the swivel angles based on Formula (3). Alternatively, these methods may be combined.

The embodiment (including the modification) described above has been provided on the assumption that the driver's seat is arranged on the right side of the vehicle compartment and that the vehicle is driven under the circumstances of the left-hand traffic. The embodiment may however be applied to the case where the driver's seat is arranged on the left side of the vehicle compartment and the vehicle is driven under the circumstances of the right-had traffic. In this case, the left and right concepts may only be reversed. What matters is that the headlight lighting angle calculation unit may only calculate the swivel angle $\theta$ based on Formula (2) when the instant vehicle takes a turn to the side of the driver's seat, and may only calculate the swivel angle $\theta$ based on Formula (3) when the instant vehicle takes a turn to the side of the passenger's seat.

In the embodiment and modifications described above, the model formulae for calculating the swivel angle $\theta$ have been changed depending on whether the curve the instant vehicle is going to enter is a left-side curve or a right-side curve, that is, whether the instant vehicle turns to the side of the driver's seat or to the side of the passenger's seat. Alternatively, the swivel angle $\theta$ may be calculated based on a single model formula.

In the embodiment and modifications described above, the headlight lighting angle calculation unit has calculated the swivel angle $\theta$ based on Formulas (2) and (3) or a singe model formula using these formulas as bases, which are represented by primary expressions. Alternative to these primary expressions, the swivel angle $\theta$ may be calculated using, for example, high-order expressions or nonlinear functions. What matters is that the lighting angle calculation unit may only calculate the lighting angle of the headlights based on not only the curve radius R and the distance L but also the line-shape information C and/or the gradient information φ.

Alternatively, the lighting angle calculation unit may calculate the lighting angle of the headlights based on only the curve radius R, distance L and line-shape information C, omitting the gradient information φ. That is, the foregoing formula (3) may be modified as:

$$\theta=\theta 2=\alpha 2+\beta 2 \times R+\gamma 2 \times L+\delta 2 \times C \quad (3')$$

Alternatively, the lighting angle calculation unit may calculate the lighting angle of the headlights based on only the curve radius R, distance L and gradient information φ, omitting the line-shape information C. The foregoing formula (3) may be modified as:

$$\theta = \theta 2 = \alpha 2 + \beta 2 \times R + \gamma 2 \times L + \epsilon 2 \times 100 \quad (3'')$$

wherein when φ is made to set to zero, a formula for the swivel angle θ1(=θ) of the left-side headlight 50L is established as follows.

$$\theta = \theta 1 = \alpha 1 + \beta 1 \times R + \gamma 1 \times L \quad (3''')$$

The desired purposes may also be achieved by these configurations.

Various other advantages according to the foregoing embodiment and modifications can be provided.

The headlight lighting angle control apparatus having such a configuration can calculate the swivel angle θ by carrying out a simple operation through the primary expression of Formula (2) which has been established taking into consideration of the curve radius R, distance L and line-shape information C.

In addition, the headlight lighting angle control apparatus having such a configuration can calculate the swivel angle θ by carrying out a simple operation through the primary expression of Formula (3) which has been established taking into consideration of the curve radius R, distance L and gradient information φ.

For example, in left-hand-traffic countries, a driver's seat is generally arranged on the right side of a vehicle compartment, and left-hand traffic is used. On the other hand, in right-hand-traffic countries, a driver's seat is generally arranged on the left side of a vehicle compartment, and right-hand traffic is used. In either of the cases, the driver's seat is barely arranged at the center of a vehicle compartment, but is generally arranged on one side.

Further, generally, for example, the left-side headlight of a vehicle in left-hand-traffic countries is installed being oriented more upward than the right-side headlight. Thus, the light is distributed so that the lighting distance ahead of the vehicle will be larger on the left side than on the right side. On the other hand, in right-hand-traffic countries, the right-side headlight of a vehicle is installed being oriented more upward than the left-side headlight. Thus, the light is distributed so that the lighting distance ahead of the vehicle will be larger on the right side than on the left side.

The inventors confirmed that, because of the one-sided arrangement of a driver's seat and the different distribution of light, in the case where a road has a given gradient, the direction in which a vehicle driver desires the headlights are lit is different, depending on whether the line shape of the curve is of a left-hand curve or of the right-hand curve.

In particular, in the case where a curve has a line shape turning toward the driver's seat and the gradient in the direction ahead of the present location of the instant vehicle is increasing (ascending right-hand curve in left-hand-traffic countries), the distance lit by the headlights of the vehicle will be shorter than in the case of a flat road. In this case, setting a large swivel angle may raise the possibility of increasing the distance lit by the headlights of the vehicle. In short, the vehicle driver may have a better chance of making a visual confirmation of the line shape of the curve.

On the other hand, in the case where a curve has a line shape turning toward the driver's seat and the gradient in the direction ahead of the present location of the instant vehicle is decreasing (descending right-hand curve in left-hand-traffic countries), the headlights of the vehicle will put the light in the horizontal direction. Accordingly, whether the swivel angle of the headlights is controlled or not, no influence will be given on the feasibility for the driver to make a visual confirmation of the line shape of the curve.

In the case where a curve has a line shape turning toward a passenger's seat (left-hand curve in left-hand-traffic countries), a point where- the driver pays the most attention is the curved line on the other side (forward side) of the road (the roadside of the opposite lane), rather than the curved line on this side of the road (the roadside of the lane on which the instant vehicle travels). As mentioned above, the headlight on the side of the passenger's seat is installed being oriented more upward than the headlight on the side of the driver's seat, and thus the light is distributed so that the lighting distance ahead of the instant vehicle will be larger on the side of the passenger's seat than on the side of the driver's seat. Accordingly, the point where the most attention is paid by the driver is sufficiently lit. In this way, in the case where the curve has a line shape turning toward the side of the passenger's seat, the need of the control for reducing the swivel angle is small. In this case, controlling the swivel angle will not contribute to achieving the driver's much easier visual confirmation of the line shape of the curve.

In this regard, the swivel angle of the headlights can be accurately controlled in line with the actual situation mentioned above.

Still another mode of the present embodiment and its modifications comprises an apparatus for controlling a lighting angle of headlights installed in a vehicle, comprising: position detecting means for a current location of the vehicle; storing means for storing road information showing a road on which the vehicle is running currently; curve obtaining means for obtaining, from the current position and the road information, a curve of the road which is located ahead of the vehicle and obtaining a radius of the curve; distance obtaining means for obtaining a distance from the current position to a starting point of the curve; curve determining means for determining whether or not the curve is an S-shaped curve; line-shape setting means for setting line-shape information showing a line shape of the S-curve, in response to determination results of the curve determining means; gradient obtaining means for obtaining gradient information showing a gradient of the vehicle in a direction along which the road continues; angle calculating means for calculating a lighting angle of the headlights based on the radius of the curve, the distance, the line-shape information, and the gradient information; and controlling means for controlling the lighting angle of the headlights based on the calculated lighting angle.

The headlight lighting angle control apparatus having such a configuration can calculate the swivel angle θ by carrying out a simple operation through the primary expression of Formula which has been established taking into consideration of the curve radius R, distance L, line-shape information C and gradient information φ.

For example, in left-hand-traffic countries, a driver's seat is generally arranged on the right side of a vehicle compartment, and left-hand traffic is used. On the other hand, in right-hand-traffic countries, a driver's seat is generally arranged on the left side of a vehicle compartment, and right-hand traffic is used. In either of the cases, the driver's seat is barely arranged at the center of a vehicle compartment, but is generally arranged on one side.

Further, generally, for example, the left-side headlight of a vehicle in left-hand-traffic countries is installed being oriented more upward than the right-side headlight. Thus, the light is distributed so that the lighting distance ahead of the vehicle will be larger on the left side than on the right side. On the other hand, in right-hand-traffic countries, the right-side headlight of a vehicle is installed being oriented more upward than the left-side headlight. Thus, the light is distributed so that the lighting distance ahead of the vehicle will be larger on the right side than on the left side.

The inventors confirmed that, because of the one-sided arrangement of a driver's seat and the different distribution of light, in the case where a road has a given gradient, the direction in which a vehicle driver desires the headlights are lit is different, depending on whether the line shape of the curve is of a left-hand curve or of the right-hand curve.

In particular, in the case where a curve has a line shape turning toward the driver's seat and the gradient in the direction ahead of the present location of the instant vehicle is increasing (ascending right-hand curve in left-hand-traffic countries), the distance lit by the headlights of the vehicle will be shorter than in the case of a flat road. In this case, setting a large swivel angle may raise the possibility of increasing the distance lit by the headlights of the vehicle. In short, the vehicle driver may have a better chance of making a visual confirmation of the line shape of the curve.

On the other hand, in the case where a curve has a line shape turning toward the driver's seat and the gradient in the direction ahead of the present location of the instant vehicle is decreasing (descending right-hand curve in left-hand-traffic countries), the headlights of the vehicle will put the light in the horizontal direction. Accordingly, whether the swivel angle of the headlights is controlled or not, no influence will be given on the feasibility for the driver to make a visual confirmation of the line shape of the curve.

In the case where a curve has a line shape turning toward a passenger's seat (left-hand curve in left-hand-traffic countries), a point where the driver pays the most attention is the curved line on the other side (forward side) of the road (the roadside of the opposite lane), rather than the curved line on this side of the road (the roadside of the lane on which the instant vehicle travels). As mentioned above, the headlight on the side of the passenger's seat is installed being oriented more upward than the headlight on the side of the driver's seat, and thus the light is distributed so that the lighting distance ahead of the instant vehicle will be larger on the side of the passenger's seat than on the side of the driver's seat. Accordingly, the point where the most attention is paid by the driver is sufficiently lit. In this way, in the case where the curve has a line shape turning toward the side of the passenger's seat, the need of the control for reducing the swivel angle is small. In this case, controlling the swivel angle will not contribute to achieving the driver's much easier visual confirmation of the line shape of the curve.

The present invention may be embodied in several other forms without departing from the spirit thereof. The present embodiments as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling a lighting angle of headlights installed in a vehicle, comprising:
    position detecting means for a current location of the vehicle;
    storing means for storing road information showing a road on which the vehicle is running currently;
    curve obtaining means for obtaining, from the current position and the road information, a curve of the road which is located ahead of the vehicle and obtaining a radius of the curve;
    distance obtaining means for obtaining a distance from the current position to a starting point of the curve based on the current position and the road information;
    curve determining means for determining whether or not the curve is an S-shaped curve based on the road information;
    line-shape setting means for setting line-shape information showing a line shape of the S-curve, in response to determination results of the curve determining means;
    angle calculating means for calculating a lighting angle of the headlights based on the radius of the curve, the distance and the line-shape information; and
    controlling means for controlling the lighting angle of the headlights based on the calculated lighting angle.

2. The apparatus of claim 1, wherein
    the distance obtaining means is adapted to obtain the distance using the starting point of the curve as a reference point,
    the line-shape setting means sets 1 to the line-shape information when the curve is the S-shaped curve and sets 0 to the line-shape information when the curve is not the S-shaped curve, and
    the angle calculating means is adapted to calculate a swivel angle as the lighting angle based on a formula of $$\theta = \alpha + \beta \times R + \gamma \times L + \delta \times C$$

where $\theta$ is the swivel angle, $\alpha$ is a constant, $\beta$, $\gamma$ and $\delta$ are coefficients, R is the curve radius, L is the distance, and C is the line-shape information.

3. The apparatus of claim 2, wherein the constant and the coefficients are set to meet a condition that the swivel angle calculated when the curve is the S-shaped curve is smaller than the swivel angle calculated when the curve is not the S-shaped curve.

4. The apparatus of claim 3, wherein the constant and the coefficients are set to make the swivel angle larger as the distance becomes smaller.

5. The apparatus of claim 3, wherein the constant and the coefficients are set to make the swivel angle smaller as the curve radius becomes larger.

6. The apparatus of claim 5, wherein the constant and the coefficients are set to make the swivel angle larger as the distance becomes smaller.

7. The apparatus of claim 2, wherein the constant and the coefficients are set to make the swivel angle smaller as the curve radius becomes larger.

8. The apparatus of claim 7, wherein the constant and the coefficients are set to make the swivel angle larger as the distance becomes smaller.

9. The apparatus of claim 2, wherein the constant and the coefficients are set to make the swivel angle larger as the distance becomes smaller.

10. The apparatus of claim 2, wherein the constant and the coefficients are set through a test on a measurement comprising steps of i) a real vehicle is made to stop at each of a plurality of locations which provides predetermined distances from a starting point of a curve of a road to be tested, the plurality of locations including the starting point, ii) each of a plurality of test drivers sits on a driver's seat of the real vehicle which has been stopped, and iii) each test driver selects, in each test driver's visual sense, a swivel angle providing the highest visibility for the test driver as to a line shape of the curve, from a plurality of swivel angles prepared beforehand.

11. An apparatus for controlling a lighting angle of headlights installed in a vehicle, comprising:
position detecting means for a current location of the vehicle;
storing means for storing road information showing a road on which the vehicle is running currently;
curve obtaining means for obtaining, from the current position and the road information, a curve of the road which is located ahead of the vehicle and obtaining a radius of the curve;
distance obtaining means for obtaining a distance from the current position to a starting point of the curve based on the current position and the road information;
gradient obtaining means for obtaining gradient information showing a gradient of the vehicle in a direction along which the road continues;
angle calculating means for calculating a lighting angle of the headlights based on the radius of the curve, the distance, and the gradient information; and
controlling means for controlling the lighting angle of the headlights based on the calculated lighting angle.

12. The apparatus of claim 11, wherein
the distance obtaining means is adapted to obtain the distance using the starting point of the curve as a reference point, and
the angle calculating means is adapted to calculate a swivel angle as the lighting angle based on a formula of $$\theta = \alpha + \beta \times R + \gamma \times L + \epsilon \times \phi$$

where $\theta$ is the swivel angle, $\alpha$ is a constant, $\beta$, $\gamma$ and $\epsilon$ are coefficients, R is the curve radius, L is the distance, and $\phi$ is the gradient information.

13. The apparatus of claim 12, wherein the constant and the coefficients are set to make the swivel angle smaller as the curve radius becomes larger.

14. The apparatus of claim 13, wherein the constant and the coefficients are set to make the swivel angle larger as the distance becomes smaller.

15. The apparatus of claim 12, wherein the constant and the coefficients are set to make the swivel angle larger as the distance becomes smaller.

16. The apparatus of claim 12, wherein the constant and the coefficients are set through a test on a measurement comprising steps of i) a real vehicle is made to stop at each of a plurality of locations which provides predetermined distances from a starting point of a curve of a road to be tested, the plurality of locations including the starting point, ii) each of a plurality of test drivers sits on a driver's seat of the real vehicle which has been stopped, and iii) each test driver selects, in each test driver's visual sense, a swivel angle providing the highest visibility for the test driver as to a line shape of the curve, from a plurality of swivel angles prepared beforehand.

17. The apparatus of claim 12, wherein
the angle calculating means is adapted to calculate the swivel angle based on a formula of $$\theta = \theta 1 = \alpha 1 + \beta 1 \times R + \gamma 1 \times L$$

where $\theta$ is the swivel angle, $\alpha 1$ is a constant, $\beta 1$ and $\gamma 1$ are coefficients, R is the curve radius, and L is the distance, when the vehicle turns along the curve curving toward a passenger's seat side; and
to calculate the swivel angle based on a formula of $$\theta = \theta 2 = \alpha 2 + \beta 2 \times R + \gamma 2 \times L + \epsilon 2 \times \phi$$

where $\theta$ is the swivel angle, $\alpha 2$ is a constant, $\beta 2$, $\gamma 2$ and $\epsilon 2$ are coefficients, R is the curve radius, L is the distance and $\phi$ is the gradient information, when the vehicle turns along the curve curving toward a driver's seat side.

18. The apparatus of claim 17, wherein the constant and the coefficients are set to make the swivel angle smaller as the curve radius becomes larger.

19. The apparatus of claim 18, wherein the constant and the coefficients are set to make the swivel angle larger as the distance becomes smaller.

20. The apparatus of claim 17, wherein the constant and the coefficients are set to make the swivel angle larger as the distance becomes smaller.

21. An apparatus for controlling a lighting angle of headlights installed in a vehicle, comprising:
position detecting means for a current location of the vehicle;
storing means for storing road information showing a road on which the vehicle is running currently;
curve obtaining means for obtaining, from the current position and the road information, a curve of the road which is located ahead of the vehicle and obtaining a radius of the curve;
distance obtaining means for obtaining a distance from the current position to a starting point of the curve based on the current position and the road information;
curve determining means for determining whether or not the curve is an S-shaped curve based on the road information;
line-shape setting means for setting line-shape information showing a line shape of the S-curve, in response to determination results of the curve determining means;
gradient obtaining means for obtaining gradient information showing a gradient of the vehicle in a direction along which the road continues;
angle calculating means for calculating a lighting angle of the headlights based on the radius of the curve, the distance, the line-shape information, and the gradient information; and
controlling means for controlling the lighting angle of the headlights based on the calculated lighting angle.

22. The apparatus of claim 21, wherein
the distance obtaining means is adapted to obtain the distance using the starting point of the curve as a reference point,
the line-shape setting means sets 1 to the line-shape information when the curve is the S-shaped curve and sets 0 to the line-shape information when the curve is not the S-shaped curve, and
the angle calculating means is adapted to calculate a swivel angle as the lighting angle based on a formula of $$\theta = \alpha + \beta \times R + \gamma \times L + \delta \times C + \epsilon \times \phi$$

where $\theta$ is the swivel angle, $\alpha$ is a constant, $\beta$, $\gamma$, $\delta$ and $\epsilon$ are coefficients, R is the curve radius, L is the distance, C is the line-shape information and $\phi$ is the gradient information.

23. The apparatus of claim 22, wherein the constant and the coefficients are set to meet a condition that the swivel angle calculated when the curve is the S-shaped curve is smaller than the swivel angle calculated when the curve is not the S-shaped curve.

24. The apparatus of claim 23, wherein the constant and the coefficients are set to make the swivel angle larger as the distance becomes smaller.

25. The apparatus of claim 23, wherein the constant and the coefficients are set to make the swivel angle smaller as the curve radius becomes larger.

26. The apparatus of claim 25, wherein the constant and the coefficients are set to make the swivel angle larger as the distance becomes smaller.

27. The apparatus of claim 22, wherein the constant and the coefficients are set to make the swivel angle smaller as the curve radius becomes larger.

28. The apparatus of claim 27, wherein the constant and the coefficients are set to make the swivel angle larger as the distance becomes smaller.

29. The apparatus of claim 22, wherein the constant and the coefficients are set to make the swivel angle larger as the distance becomes smaller.

30. The apparatus of claim 22, wherein the constant and the coefficients are set through a test on a measurement comprising steps of i) a real vehicle is made to stop at each of a plurality of locations which provides predetermined distances from a starting point of a curve of a road to be tested, the plurality of locations including the starting point, ii) each of a plurality of test drivers sits on a driver's seat of the real vehicle which has been stopped, and iii) each test driver selects, in each test driver's visual sense, a swivel angle providing the highest visibility for the test driver as to a line shape of the curve, from a plurality of swivel angles prepared beforehand.

31. The apparatus of claim 22, wherein
the angle calculating means is adapted to calculate the swivel angle based on a formula of $$\theta=\theta1=\alpha1+\beta1 \times R+\gamma1 \times L+\delta1 \times C$$

where $\theta$ is the swivel angle, $\alpha1$ is a constant, $\beta1, \gamma1$, and $\delta1$ are coefficients, R is the curve radius, L is the distance and C is the line-shape information, when the vehicle turns along the curve curving toward a passenger's seat side; and
to calculate the swivel angle based on a formula of $$\theta=\theta2=\alpha2+\beta2 \times R+\gamma2 \times L+\delta2 \times C+\epsilon2 \times \phi$$

where $\theta$ is the swivel angle, $\alpha2$ is a constant, $\beta2, \gamma2, \delta2$ and $\epsilon2$ are coefficients, R is the curve radius, L is the distance, C is the line-shape information, and $\phi$ is the gradient information, when the vehicle turns along the curve curving toward a driver's seat side.

32. The apparatus of claim 31, wherein the constant and the coefficients are set to meet a condition that the swivel angle calculated when the curve is the S-shaped curve is smaller than the swivel angle calculated when the curve is not the S-shaped curve.

33. The apparatus of claim 32, wherein the constant and the coefficients are set to make the swivel angle larger as the distance becomes smaller.

34. The apparatus of claim 31, wherein the constant and the coefficients are set to make the swivel angle smaller as the curve radius becomes larger.

35. The apparatus of claim 34, wherein the constant and the coefficients are set to make the swivel angle larger as the distance becomes smaller.

36. The apparatus of claim 31, wherein the constant and the coefficients are set to make the swivel angle smaller as the curve radius becomes larger.

37. The apparatus of claim 36, wherein the constant and the coefficients are set to make the swivel angle larger as the distance becomes smaller.

38. The apparatus of claim 31, wherein the constant and the coefficients are set to make the swivel angle larger as the distance becomes smaller.

39. The apparatus of claim 31, wherein the constant and the coefficients are set through a test on a measurement comprising steps of i) a real vehicle is made to stop at each of a plurality of locations which provides predetermined distances from a starting point of a curve of a road to be tested, the plurality of locations including the starting point, ii) each of a plurality of test drivers sits on a driver's seat of the real vehicle which has been stopped, and iii) each test driver selects, in each test driver's visual sense, a swivel angle providing the highest visibility for the test driver as to a line shape of the curve, from a plurality of swivel angles prepared beforehand.

* * * * *